United States Patent
Aandewiel et al.

(10) Patent No.: US 9,675,092 B2
(45) Date of Patent: Jun. 13, 2017

(54) POULTRY PROCESSING LINE

(71) Applicant: Meyn Food Processing Technology B.V., Oostzaan (NL)

(72) Inventors: Leendert Aandewiel, Oostzaan (NL); Simon Bakker, Oostzaan (NL); Aloysius Christianus Maria Van Steijn, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 14/327,914

(22) Filed: Jul. 10, 2014

(65) Prior Publication Data

US 2015/0017896 A1    Jan. 15, 2015

(30) Foreign Application Priority Data

Jul. 12, 2013   (NL) ..................................... 2011161

(51) Int. Cl.
*A22C 21/00* (2006.01)
*A22B 7/00* (2006.01)

(52) U.S. Cl.
CPC .......... *A22C 21/0053* (2013.01); *A22B 7/003* (2013.01); *A22C 21/00* (2013.01)

(58) Field of Classification Search
CPC ......... A22B 7/001; A22B 7/003; A22B 7/005; A22C 21/0053
USPC ........ 452/177, 179, 180, 181, 182, 183, 184
See application file for complete search history.

(56) References Cited

U.S. PATENT DOCUMENTS

| | | | | |
|---|---|---|---|---|
| 4,034,440 A * | 7/1977 | van Mil | ............. | A22C 21/0053 104/96 |
| 4,096,950 A * | 6/1978 | Brook | ....................... | B07C 5/28 177/145 |
| 4,813,101 A * | 3/1989 | Brakels | .............. | A22C 21/0053 198/465.2 |
| 5,001,812 A * | 3/1991 | Hazenbroek | ....... | A22C 21/0076 452/135 |
| 5,344,360 A * | 9/1994 | Hazenbroek | ....... | A22C 21/0053 452/178 |
| 5,453,045 A * | 9/1995 | Hobbel | .............. | A22C 21/0053 452/182 |
| 5,505,657 A | 4/1996 | Janssen | | |
| 6,811,480 B2 * | 11/2004 | Moriarty | ............ | A22C 21/0007 452/179 |

(Continued)

OTHER PUBLICATIONS

Search Report for NL 2011161, dated Dec. 7, 2013.

*Primary Examiner* — David Parsley
(74) *Attorney, Agent, or Firm* — Dority & Maning, P.A.

(57) ABSTRACT

A poultry processing line is provided having a series of poultry carriers and a processing unit or processing units, wherein the poultry carriers are movable to and from the processing unit or processing units and the poultry carriers and the processing unit or processing units are synchronized to enable processing of the poultry by the processing unit or processing units. A switch is provided such that the poultry carriers and/or the processing unit or processing units are selectable between an operational position in which the poultry is processed by the processing unit or units and an inoperational or idle position in which the poultry is prevented from being processed by the processing unit or units.

23 Claims, 5 Drawing Sheets

(56) References Cited

U.S. PATENT DOCUMENTS

| | | | | |
|---|---|---|---|---|
| 7,125,330 B2* | 10/2006 | Beeksma | ........... | A22C 21/0053 |
| | | | | 452/178 |
| 7,133,742 B2* | 11/2006 | Cruysen | ............. | A22C 21/0053 |
| | | | | 198/349 |
| 8,360,232 B2* | 1/2013 | Hazenbroek | ....... | A22C 21/0007 |
| | | | | 198/465.4 |
| 2011/0183592 A1* | 7/2011 | Stooker | .............. | A22C 21/0076 |
| | | | | 452/136 |
| 2013/0037381 A1 | 2/2013 | Hazenbroek | | |

* cited by examiner

POULTRY PROCESSING LINE

FIELD OF THE INVENTION

The subject matter of the present disclosure relates generally to a poultry processing line and more particularly to a processing line having a series of poultry carriers and a processing unit or processing units.

BACKGROUND OF THE INVENTION

By way of example, a poultry processing line is disclosed in EP-B-1139769, which indicates the use of pivot arms to select whether a processing unit is required to operate on a passing poultry carcass or not. The selection whether or not to process the poultry carcass can be the result of a very diverse decision process and be based for instance on quality control, veterinarian inspection, weight selection, an intended type of end-product for the poultry carcasses, or any possible combination of such decisions.

A problem of the prior art solution with pivot arms that are to be placed in a desired position to either have the poultry carcasses move in concert and in close vicinity with a processing unit, or to bypass the poultry carcasses along such processing unit, is that this solution is not particularly suited for high-speed processing lines. The risk is more than imminent, when higher speeds are applied, that an unintentional yet disastrous jamming will occur of the conveyed poultry when the pivot arm has not yet reached its final position but is somewhere in between.

The applicant has been faced with this problem of the prior art solution for at least a decade and has now come up with an alternative which is very suited for high-speed applications, which is versatile in the way it may be implemented, and is elegant in the way it combines robustness with simplicity.

SUMMARY OF THE INVENTION

The invention relates to a processing line including a series of poultry carriers and a processing unit or processing units. The poultry carriers are movable to and from the processing unit or processing units. The poultry carriers and the processing unit or processing units are synchronized to enable processing of the poultry by the processing unit or processing units. The poultry carriers and/or the processing unit or processing units are selectable between an operational position in which the poultry is processed by the processing unit or units and an in-operational or idle position in which the poultry is prevented from being processed by the processing unit or units.

The poultry processing line of the invention has the features of one or more of the appended claims. In one exemplary embodiment of a processing line, a selected one of the poultry carriers and the processing unit or units is provided with a switch having at least two positions: 1) a first position in which the selected one of the poultry carriers and the processing unit or units is caused to follow a first path that brings the poultry carriers and the processing unit or units together so as to enable that the processing unit or units process the poultry carried by the poultry carriers, and 2) a second position in which the selected one of the poultry carriers and the processing unit or units is caused to follow a second path which keeps the poultry carriers and the processing unit or units apart so as to prevent that the processing unit or units process the poultry carried by the poultry carriers.

A notable disadvantage of the prior art solution to work with a stationary pivot arm or arms is prevented by mounting the switch that operates as the selection mechanism on either the poultry carriers or the processing units. In this way the selection mechanism, the switch, moves together with the part on which it is mounted, which effectively prevents that the switch may get jammed.

Appropriately, the switch is movable between its first position and second position by at least one actuator. This actuator can be tailored perfectly to the requirements for securely operating the switch, especially when the switch moves by at high-speed.

It is possible and even preferential that the at least one actuator has a stationary position with reference to the poultry carriers and processing unit or units. In this way the at least one actuator can operate on the switches of all poultry carriers and processing units that move along the actuator.

It is preferable that the processing line has means for moving the switch to a selected one of the first and second positions after the concerning poultry carriers have passed the concerning processing unit or units. In this way, a standard starting position for the switch can be provided, forming a reliable starting point for the at least one actuator to move the switch to the eventually desired position, which occasionally may mean that the actuator can remain in-operational if the eventual desired position agrees with the starting position of the switch.

The versatility of the solution according to an exemplary embodiment of the invention is exemplified by the fact that the processing unit or processing units may be selected from linearly moving processing means and rotating processing means.

A preferred exemplary embodiment of the processing line with the switch is that the switch is at least in part embodied as a movable slide that is arranged in the selected one of the poultry carriers and the processing unit or units, which movable slide carries a cam follower that is arranged to cooperate with a cam track that defines a selected one of the first path and the second path for the cam follower and the selected one of the poultry carriers and the processing unit or units to which the cam follower is connected.

It is further preferable that the cam track is provided with a ramp to press the cam follower out of the cam track after the concerning poultry carriers have passed the concerning processing unit or units and into a position corresponding to a selected one of the first and second positions of the switch. This provides for the earlier mentioned reliable starting position for the switch.

A suitable manner of implementing an exemplary embodiment of the invention is by providing that the processing unit or processing units are mounted on slides of a processing machine, which is provided with a cam track, and that each of the processing units is provided with a movable slide on which a cam follower is mounted. The movable slide is movable between a first position in which the cam follower engages the can track and a second position in which the cam follower is disengaged from the cam track. Preferably then there are actuating means for engaging and/or disengaging the cam follower with/from the cam track.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention. The invention will hereinafter be further elucidated with reference to the drawings of non-limiting exemplary embodiments of a processing line in accordance with the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION

Figure 1:
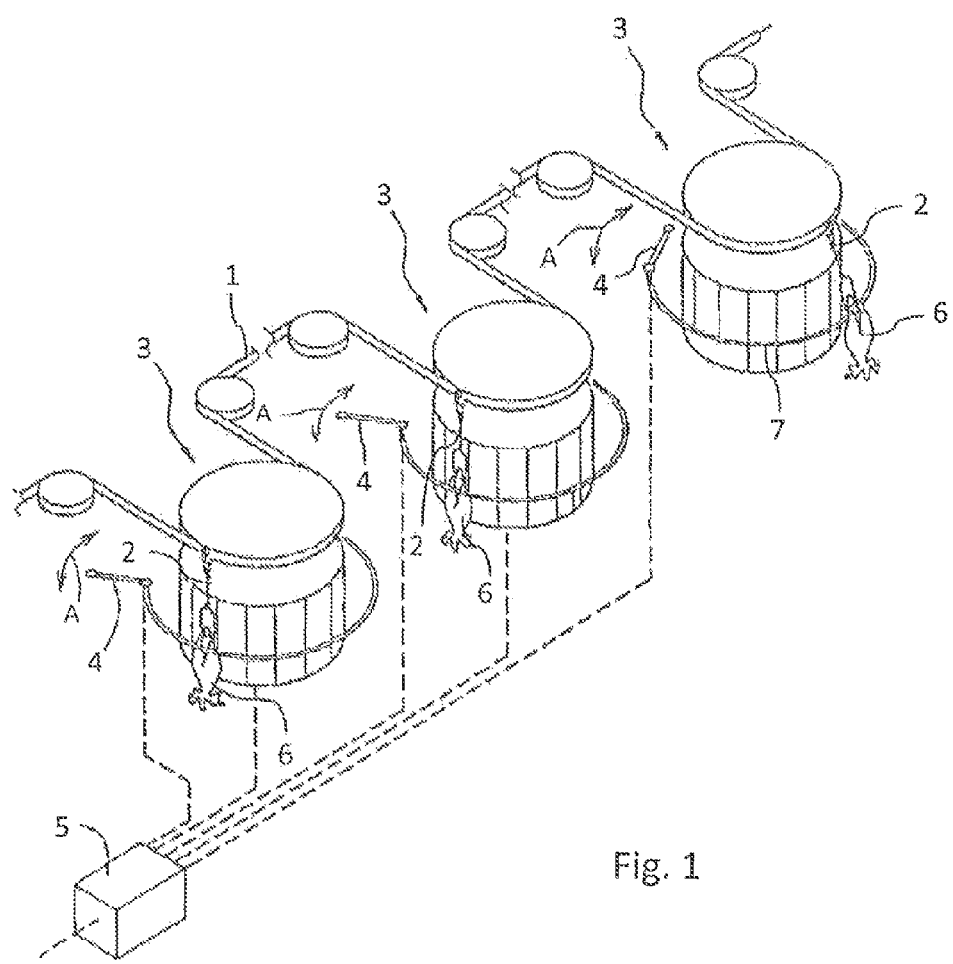
FIG. 1 illustrates an example of a prior art processing line.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

With reference to FIG. 1 a brief overview of the prior art processing line 1 is shown. This processing line 1 includes in a known way a series of poultry carriers 2 and a series of processing means 3 that are equipped with processing units. Due to their movement in the processing line 1, the poultry carriers 2 move towards each of the processing means 3 and their processing units, pass these processing means 3 with the processing units provided thereon, and move then further and away from these processing units of the processing means 3. In known fashion the poultry carriers 2 and the processing units on the processing means 3 are synchronized to enable processing of the poultry by the processing units of the processing means 3. In certain embodiments, the present invention incorporates aspects of the processing line of the prior art.

In FIG. 1 it is shown how this conventional system executes the selection that arranges that the processing unit or processing units 3 to be selectable between 1) an operational position in which the poultry is processed by the processing unit or units of processing means 3, and 2) an in-operational or idle position in which the poultry is prevented from being processed by the processing unit or units of such processing means 3. For this purpose, the prior art system of FIG. 1 uses pivot arms 4 that are moved according to arrows A subject to the control of e.g., a computer system 5. In the two left hand processing means 3, poultry carcasses 6 move in concert and in close proximity of the processing units of the processing means 3, which is caused by the fact that the pivot arms 4 located immediately in front of the two first left-hand processing means 3 are swivelled to a position that provides the poultry carrier 2 the required access to the processing means 3. Prior to arriving at the third right-hand processing means 3, however, the pivot arm 4 immediately in front of these last processing means 3 has closed off the access to it, causing the concerning poultry carcasses 6 to bypass the processing units of the right-hand processing means by moving along a guide rail 7, which keeps the poultry carcasses 6 at a distance from the processing units preventing them from processing the carcasses 6.

In exemplary aspects of the present invention illustrated in FIGS. 2 through 5, it is shown how the selection is executed that arranges that the processing unit or processing units of processing means 3 are selectable between 1) an operational position in which the poultry is processed by such processing unit or units and 2) an in-operational or idle position in which the poultry is prevented from being processed by the processing unit or units of such processing means 3.

Figure 2:
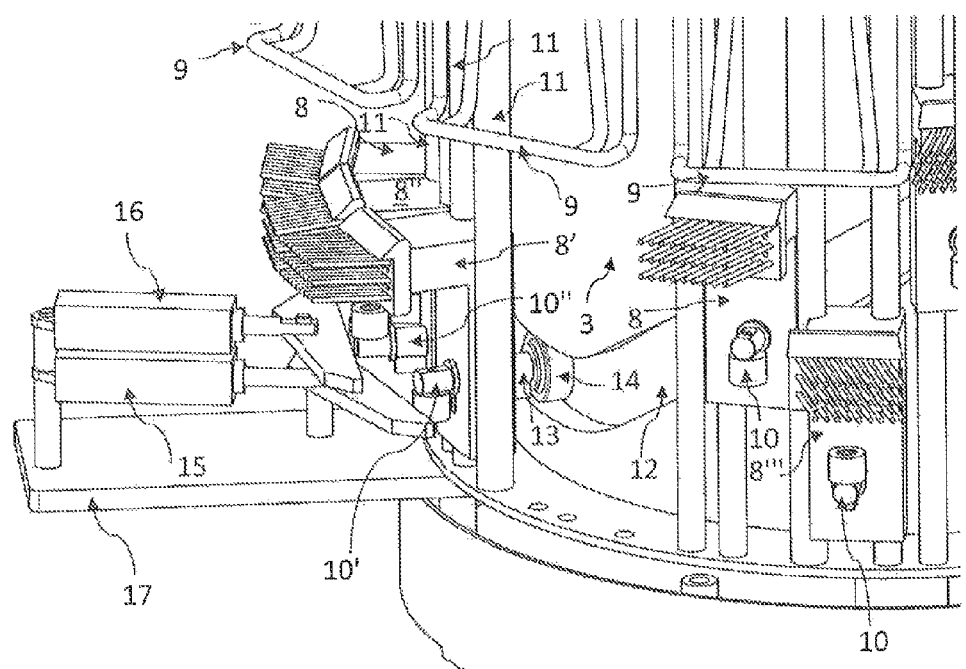
FIG. 2 provides a detailed view of a rotating processing means that is provided with processing units that can be selectively activated in accordance with exemplary aspects of the invention.

FIG. 2 provides a detailed isometric view of a rotating processing means 3 that is provided with processing units 8 that can be selectively activated in accordance with the invention. FIG. 2 also shows a part of the poultry carriers 9 by which the poultry carcasses, for instance suspended by the legs or suspended by the feet, can be moved into close proximity to the processing means 3. Although the following disclosure will refer to applying certain features to implement the invention only with reference to the processing units 8, the same could of course likewise and without inventive effort be done by implementing these features in combination with the poultry carriers 9. For clarity purposes, the discussion of the examples however only refers to the implementation of the relevant features with respect to the processing units. In accordance with the general applicability of the inventive concept the appended claims, however, covers both possibilities.

FIG. 2 shows that the processing units 8 are each provided with a switch 10, 10', 10" having at least two positions. Switch 10' for instance is in a first position in which the processing unit 8' is caused to follow a first path which brings it in close proximity to the corresponding poultry carrier that moves synchronously with processing unit 8' so as to arrange that processing unit 8' can process the poultry carried by the concerning poultry carrier. As a further example, switch 10" is in a second position in which the processing unit 8" is caused to follow a second path, which keeps the corresponding poultry carrier and the processing unit 8" at a distance from each other so as to prevent that the processing unit 8" will process the poultry carried by the concerning poultry carrier that moves in concert with this processing unit 8".

The non-limiting example of FIG. 2 is embodied by arranging that the processing units 8, 8', 8" are mounted on slides 11 forming part of the processing machine 3. The processing units 8, 8', 8" can thus move up-and-down the slides 11. Whether or not the processing units will move up-and-down the slides 11 is determined with help of a cam track 12 that is provided in the rotating processing means 3. The switch of each processing unit 8, 8', 8" determines whether or not these processing units will move in accordance with the cam track 12. The switch 10, 10', 10" of each processing unit 8, 8', 8" is for this purpose and in this example embodied such that each processing unit 8, 8', 8" is provided with a movable slide 13 on which a cam follower 14 is mounted. The movable slide 13 is movable between a first position in which the cam follower 14 engages the cam track 12, which is the situation shown in FIG. 2 with reference to the processing unit 8'—and a second position in which the cam follower 14 will be disengaged from the cam track 12. In the latter situation, the processing unit of which the cam follower 14 does not engage the cam track 12, will not follow this cam track 12 and consequently will maintain at its original level without moving up or down. An example of such a situation is shown with reference to processing unit 8'''.

Movement of the switch 10, 10', 10" between its first position and second position is performed by at least one actuator 15, 16. In this example, there are two actuators that can be activated independently from each other. The actuators 15, 16 are mounted in a stationary position with reference to the poultry carriers 9 and the processing units 8, 8', 8" of the processing means 3. This means that while the processing means 3 and the processing units 8, 8', 8" mounted thereon rotate, and while the poultry carriers 9 move synchronously and in proximity of the processing means 3, they pass the actuator means 15, 16 that are mounted on a stationary support 17. At the appropriate moment when the processing means 8, 8', 8" pass the actuator means 15, 16, the actuator means can be activated to selectively move the switches 10, 10', 10". This is embodied by the slides with the cam followers mounted thereon—in engagement with the cam track 12. This is shown in FIG. 2 with reference to processing unit 8' and its slide 13 with the cam follower 14 mounted thereon. Alternatively, the movement of the switches by the actuator means 15, 16 can be suppressed in order to leave the cam followers mounted on the slides out of engagement with the cam track 12, as is done with the processing unit 8''', also shown in FIG. 2.

Figure 3:
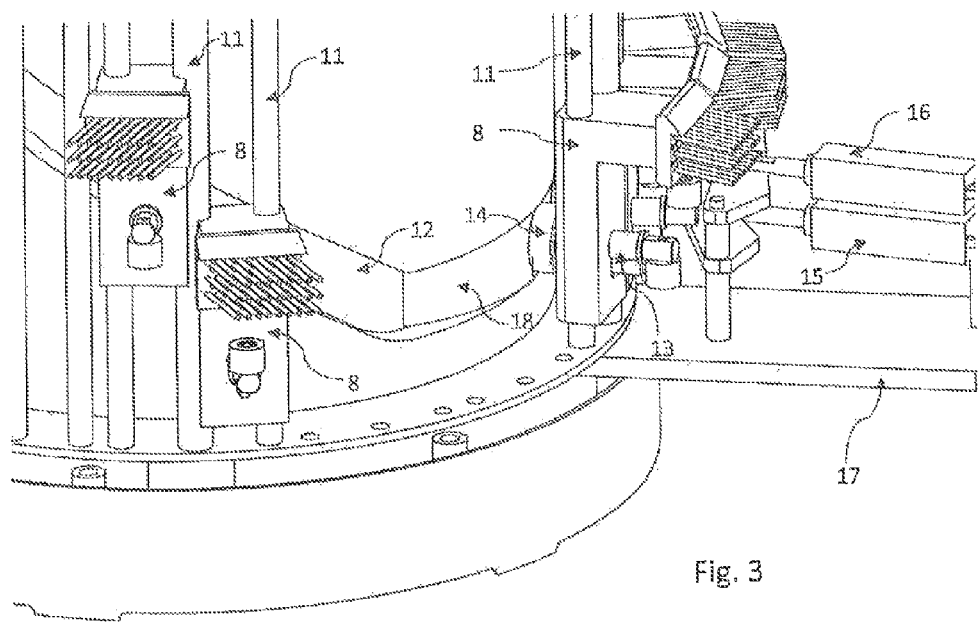
FIG. 3 shows the processing means of FIG. 2 at its exit section when the poultry carrier departs from the rotating processing means.

In FIG. 3 means are shown, in this particular case embodied as a ramp 18, for moving each switch, which in this non-limiting example is embodied as a slide 13 with a cam follower 14 mounted thereon, into disengagement with the cam track 12. This must occur at the moment after the concerning poultry carrier has passed the corresponding processing unit 8. This movement of the cam follower 14 out of engagement with the cam track 12 corresponds to the second position of the switch 10 in which the processing unit 8 is caused to follow a second path which keeps the poultry carrier and the processing unit apart so as to prevent that this processing unit processes the poultry carried by the synchronously moving poultry carrier. This is then a starting position from which a selection can be made for any next arriving poultry carcasses at the processing means 3, for which it is to be decided whether they have to be processed or not by the processing units 8, 8', 8" in the manner as is elucidated here above with reference to FIG. 1. It is however also possible to arrange that as such a starting position the first position of the switch is selected, which first position will arrange that the processing unit will process the poultry carried by the corresponding poultry carrier.

Figure 4:
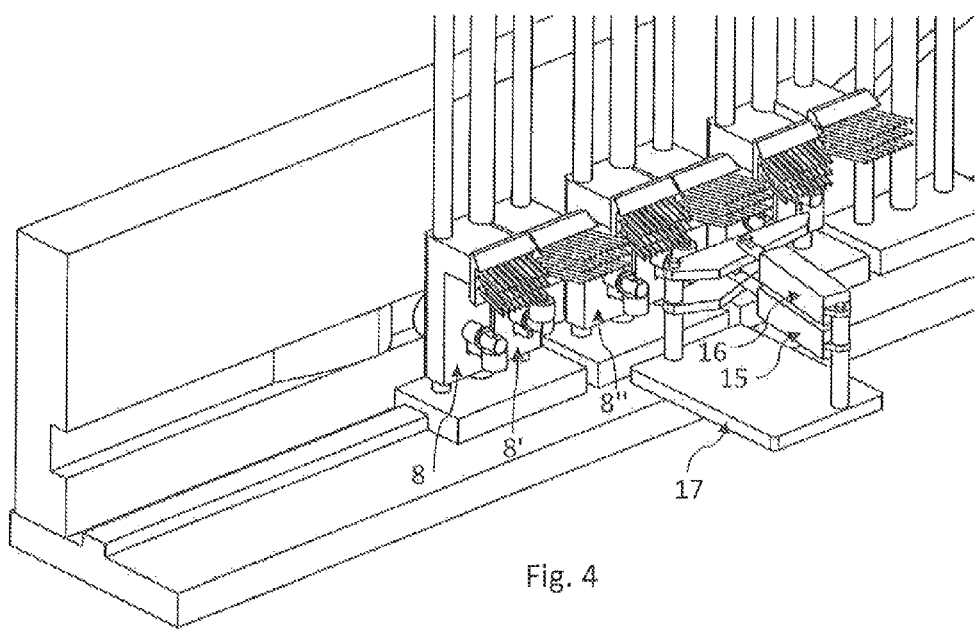
FIG. 4 shows an exemplary embodiment of the invention in which the processing means moves linearly.

FIG. 4 provides a view to an alternative embodiment to show that the processing unit or processing units 8, 8', 8" can also be selected to form part of linearly moving processing means.

Figure 5:
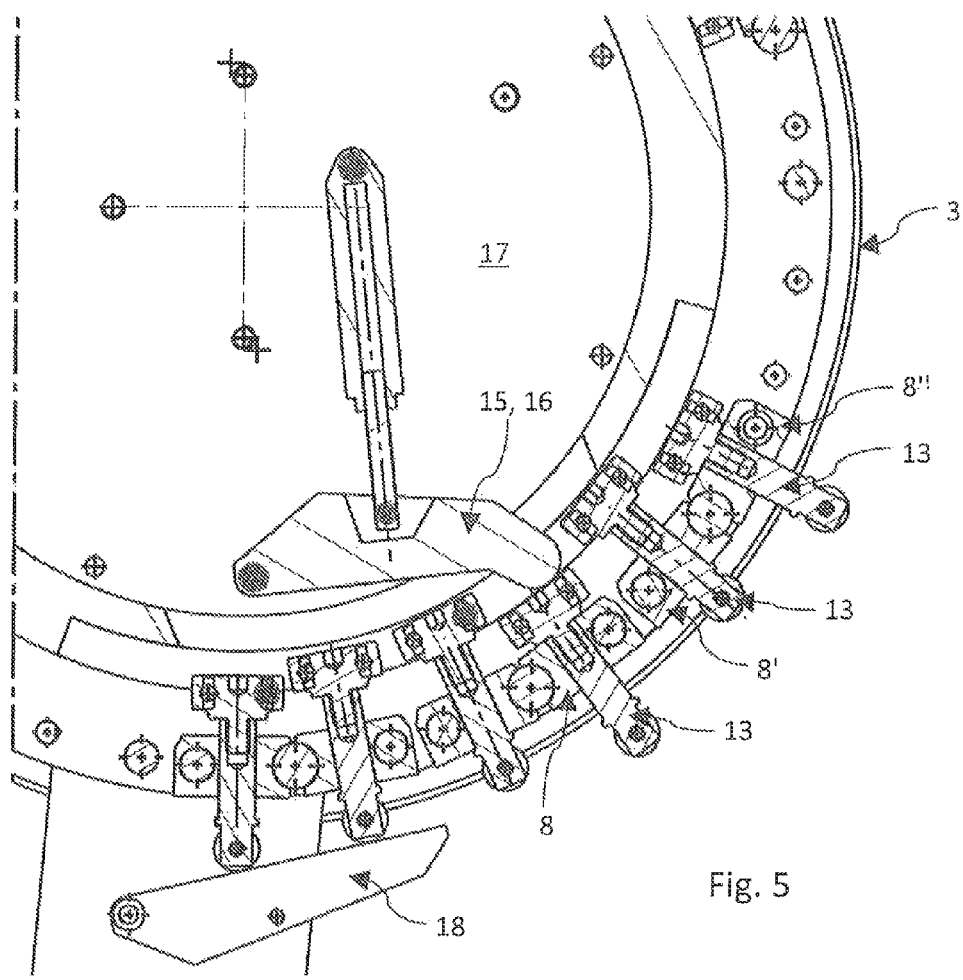
FIG. 5 shows an exemplary embodiment in which the actuation means for the processing units is positioned within the rotating processing means.

FIG. 5 provides a sectional top view at an embodiment in which the actuation means 15, 16 for the processing units 8, 8', 8" are positioned within the rotating processing means 3 and mounted on a stationary platform 17 within said processing means 3. A separate lever 18 adjacent to the outer circumference of the rotating processing means 3 may then be used (instead of a ramp within the cam track) to return the processing units 8, 8', 8" to their initial or starting position immediately prior to the moment that the selective activation of the actuation means 15, 16 takes place for movement of the processing units 8, 8', 8" in their desired position to select between processing of the poultry or preventing processing of the poultry.

It will be clear for the skilled person from the above description that there are many variations feasible to the exemplary embodiments provided herein without departing from the protective scope as embodied in the appended claims. The examples provided are therefore not to be understood as limiting as to the appended claims, but merely as elucidation of the wording of these claims without compromising their protective scope.

What is claimed is:
1. A poultry processing line, comprising:
a processing means configured for processing poultry
a cam track positioned on the processing means;
a plurality of processing units supported on the processing means and movable up and down along the processing means;
a plurality of poultry carriers movable along a processing line that causes each poultry carrier to travel towards the processing units supported on the processing means, pass beside the processing units supported on the processing means, and then travel away from the processing units supported on the processing means as each poultry carrier moves along the processing line; and
wherein each processing unit comprises a switch that travels with the processing unit and is movable towards and away from the cam track on the processing means between at least a first position and a second position, wherein in the first position the switch causes the processing unit and one of the poultry carriers to move closer together and in synchronization with each other as the processing unit follows a first path along the processing means while poultry is processed by the processing unit, wherein in the second position the switch causes the processing unit to follow a second path along the processing means that maintains the processing unit away from the poultry carriers so as to prevent processing of poultry by the processing unit.

2. The poultry processing line as in claim 1, wherein each processing unit further comprises:
a slide connected with the switch; and
a cam follower mounted on the slide and configured for engaging the cam track when the switch is in the first position.

3. The poultry processing line as in claim 2, wherein the cam follower-travels at least partially within the cam track when the switch is in the first position.

4. The poultry processing line as in claim 3, wherein the cam track comprises a ramp to press the cam follower out of the cam track after the poultry carriers have passed the one or more processing units and into a position corresponding to a selected one of the first and second positions of the switch.

5. The poultry processing line as in claim 3, further comprising means for engaging and disengaging the cam follower with or from the cam track.

6. The poultry processing line as in claim 1, further comprising slides supported on the processing means and along which the processing units are slidable up and down relative to processing means.

7. The poultry processing line of claim 1, further comprising an actuator, and wherein the switch is movable between the first position and the second position by the actuator.

8. The poultry processing line according to claim 7, wherein the at least one actuator has a stationary position with reference to the poultry carriers and the one or more processing units.

9. The poultry processing line as in claim 1, wherein the processing means is rotatable.

10. The poultry processing line as in claim 1, wherein the processing units are located on an outer circumference of the processing means.

11. The poultry processing line as in claim 9, wherein the processing units are located on an outer circumference of the processing means.

12. The poultry processing line as in claim 11, wherein the cam track is located on an outer circumference of the processing means.

13. The poultry processing line as in claim 11, wherein the processing means rotates in synchronization with the poultry carriers moving along the first path.

14. A poultry processing line, comprising:
   a plurality of poultry carriers;
   a processing means for processing the poultry, the plurality of poultry carriers movable towards and away from the processing means;
   a plurality of processing units carried on the processing means and movable along either 1) a first path along the processing means that brings the processing units into proximity of the poultry carriers and moving in synchronization with the processing units such that the processing units can process poultry on the poultry carriers and 2) a second path that keeps the poultry carriers and the processing units apart so as to prevent that the processing units from processing poultry carried by the poultry carriers;
   a plurality of slides positioned on the processing means, the processing units movable up and down the slides; and
   a plurality of switches, each switch associated with one of the processing units and movable up and down the slide with the processing unit, the switch having at least two positions including a first position in which the switch causes one of the processing units to move along the first path and a second position in which the switch causes one of the processing units to move along the second path.

15. The poultry processing line of claim 14, further comprising at least one actuator configured for moving the switch between the first position and the second position.

16. The poultry processing line according to claim 15, wherein the at least one actuator has a stationary position with reference to the poultry carriers and the processing units.

17. The poultry processing line as in claim 14, further comprising means for moving the switch to a selected one of the first and second positions after the poultry carriers have passed by the processing units.

18. The poultry processing line as in claim 14, wherein the one or more processing units are selected from linearly moving processing means and rotating processing means.

19. The poultry processing line as in claim 14, further comprising:
   a cam track;
   a plurality of movable slides, each switch connected to one of the movable slides; and
   a plurality of cam followers, each cam follower carried on one of the movable slides.

20. The poultry processing line as in claim 19, wherein each movable slide is movable between a first position in which the respective cam follower engages the cam track and a second position in which the respective cam follower is disengaged from the cam track; where such movement of the slides between the first and second position causes the processing units to move along either the first path or the second path.

21. The poultry processing line as in claim 20, wherein the cam track is provided with a ramp to press the cam follower out of the cam track after the poultry carriers have passed the processing units and into a position corresponding to a selected one of the first and second positions of the switch.

22. The poultry processing line as in claim 19, further comprising means for engaging and disengaging the cam follower with or from the cam track.

23. The poultry processing line as in claim 20, wherein the movable slide is movable towards and away from the processing means.

* * * * *